United States Patent [19]
Kohno

[11] Patent Number: 4,640,481
[45] Date of Patent: Feb. 3, 1987

[54] CAMERA HOLDER

[75] Inventor: Teruo Kohno, Yokohama, Japan

[73] Assignee: Victor Company of Japan, Limited, Kanagawa, Japan

[21] Appl. No.: 651,547

[22] Filed: Sep. 17, 1984

[30] Foreign Application Priority Data

Sep. 30, 1983 [JP] Japan ............... 58-150574[U]

[51] Int. Cl.$^4$ ............................................. A47G 29/00
[52] U.S. Cl. .................................. 248/126; 248/188.6; 248/231.4; 354/293
[58] Field of Search ............ 248/126, 170, 125, 188.6, 248/188.7, 231.4, 231.6; 354/293, 294

[56] References Cited

U.S. PATENT DOCUMENTS

| 2,195,366 | 3/1940 | Haigh | 248/231.4 X |
| 4,121,799 | 10/1978 | Michio | 248/188.7 X |
| 4,285,485 | 8/1981 | Burke | 248/291 |
| 4,377,269 | 3/1983 | Sellner | 248/188.6 |

FOREIGN PATENT DOCUMENTS

| 730340 | 1/1943 | Fed. Rep. of Germany | 248/188.7 |
| 1062943 | 8/1959 | Fed. Rep. of Germany | 248/170 |
| 35082 | 12/1929 | France | 248/188.6 |
| 913550 | 12/1962 | United Kingdom | 354/293 |

Primary Examiner—J. Franklin Foss
Assistant Examiner—David L. Talbott
Attorney, Agent, or Firm—Jordan and Hamburg

[57] ABSTRACT

A holder for holding a TV camera or like camera selectively serves as a clamp, a breast support arm, a tripod and a grip. The camera is mounted on one end of a first pipe, while a second pipe is telescoped in the first pipe to be slidable therealong. First and second clamp seats are mounted on the second pipe. The second clamp seat is provided with a rotatable arm which is slidable along and rotatable about the axis of the second pipe. The clamp, breast support arm or grip function is attained by rotating the rotatable arm to a predetermined fixing position and moving the second clamp to be predetermined fixing position on the second pipe. Two legs are nested in the second pipe such that when the tripod function is desired the legs are pulled out from the second pipe, opened by a predetermined angle away from each other, and fixed in the opened position.

13 Claims, 13 Drawing Figures

CAMERA HOLDER

BACKGROUND OF THE INVENTION

The present invention relates to a camera holder and, more particularly, to a holder for a television (TV) camera or the like which selectively serves as a clamp, a breast support arm, a tripod and a grip.

Most of prior art holders for use with TV cameras, for example, are designed to implement a single function such as the function of a clamp, that of a breast arm, that of a tripod or that of a grip and, therefore, not very versatile. While camera holders featuring a couple of combined functions such as tripod and breast support arm functions and tripod and clamp functions have been proposed, they are still limited in applications and, in addition, rather bulky.

SUMMARY OF THE INVENTION

It is therefore an object of the present invention to provide a camera holder which is capable of selectively functioning at least as a clamp, a breast support arm, a tripod, and a grip.

It is another object of the present invention to provide a camera holder which can be stored in a compact and handy configuration when out of use.

It is another object of the present invention to provide an easy-to-use camera holder.

It is another object of the present invention to provide a stable camera holder which in a tripod mode use allows its legs to be opened with ease and secures the opened legs.

It is another object of the present inventin to provide a generally improved camera holder.

A camera holder having multiple functions of the present invention comprises a first pipe provided with camera mount means at one end thereof, a second pipe telescoped in the first pipe from the other end of the first pipe to be slidable along an axis of the first pipe, a pipe fastener for fastening the second pipe telescoped in the second pipe at a desired position, a first clamp seat rigidly mounted on the second pipe, a second clamp seat mounted on an outer periphery of the second pipe to be slidable along and rotatable about an axis of the second pipe, the second clamp seat being provided with a rotatable arm having a locking device, a clamp fastener for fastening the second clamp seat after positioning the second clamp seat relative to the second pipe, a breast support arm constituted by the first and second clamp seats, the rotatable arm of the second clamp seat and the clamp fastener and operable in a breast support arm mode such that the rotatable arm is rotated and locked by the locking device in a predetermined angular position and the second clamp seat is moved to a predetermined fixing position on the second pipe and rotated until the second clamp seal becomes locked to the first clamp seat whereby the second clamp seat is fastened by the clamp fastener at the predetermined fixing position, and legs for cooperating with the rotatable arm of the second clamp to constitute a tripod, the legs being nested in the second pipe when out of use and pulled out when in use.

In accordance with the present invention, a holder for holding a TV camera or like camera selectively serves as a clamp, a breast support arm, a tripod and a grip. The camera is mounted on one end of a first pipe, while a second pipe is telescoped in the first pipe to be slidable therealong. First and second clamp seats are mounted on the second pipe. The second clamp seat is provided with a rotatable arm which is slidable along and rotatable about the axis of the second pipe. The clamp, breast support arm or grip function is attained by rotating the rotatable arm to a predetermined fixing position and moving the second clamp to a predetermined fixing position on the second pipe. Two legs are nested in the second pipe such that when the tripod function is desired the legs are pulled out from the second pipe, opened by a predetermined angle away from each other, and fixed in the opened position.

The above and other objects, features and advantages of the present invention will become apparent from the following detailed description taken with the accompanying drawings.

DESCRIPTION OF THE PREFERRED EMBODIMENTS

While the camera holder of the present invention is susceptible of numerous physical embodiments, depending upon the environment and requirements of use, subtantial numbers of the herein shown and described embodiments have been made, tested and used, and all have performed in an eminently satisfactory manner.

Figure 1:
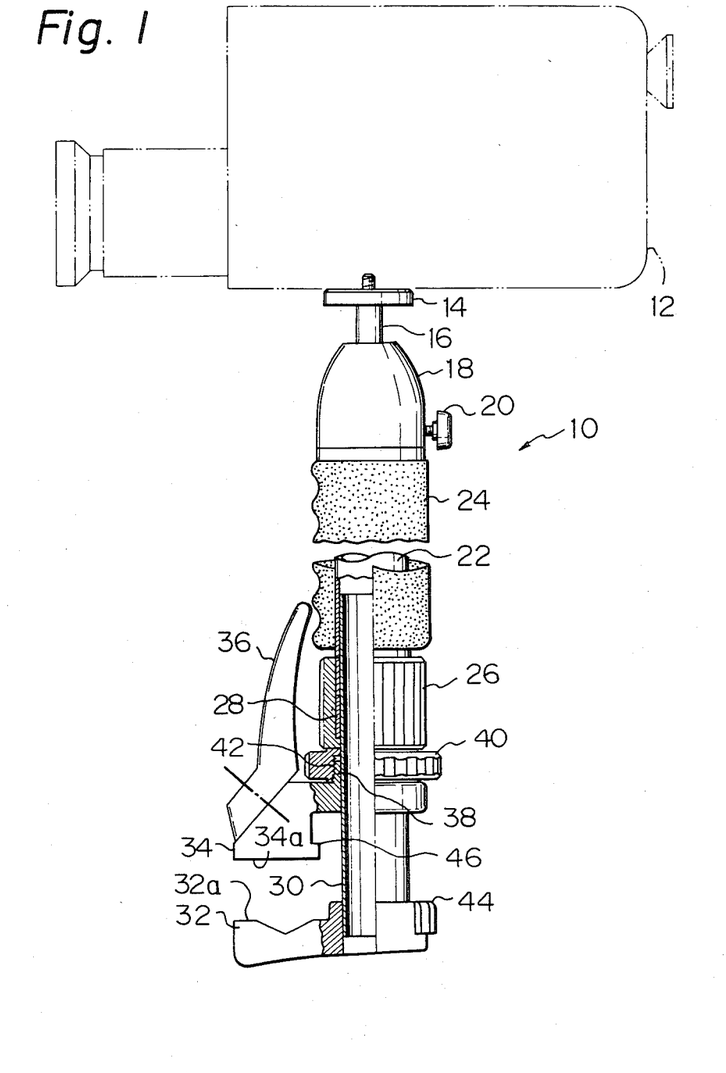
FIG. 1 is a vertical section of a camera holder embodying the present invention.

Referring to FIG. 1, a camera holder in accordance with the present invention is shown and generally designated by the reference numeral 10. A TV camera 12 is detachably mounted on a camera mount 14 of the camera holder 10. The camera mount 14 has a shaft 16 which is rotatably mounted in a free pan head 18 and adjusted in position by a pan head fastening screw 20. A pipe 22 is positioned below the pan head 18, while a grip portion 24 made of rubber or like material is fit on the outer periphery of the pipe 22. The pipe 22 carries a tubular pipe fastening ring 26 in a lower end portion thereof. The ring 26 is adapted to fasten the pipe 22 to another pipe 30 in cooperation with a spacer 28, which is positioned radially inwardly of the ring 26. Specifically, the pipe 30 is telescoped in the pipe 22 and firmly tied to the pipe 22 by the ring 28.

A clamp seat 32 is rigidly mounted on a lower end portion of the pipe 30. Also arranged on the pipe 30 is another clamp seat 34 having a rotatable arm 36 therewith. The arm 36 is rotatable about a dash-and-dot line in FIG. 1 and provided with means for locking the arm in a predetermined angular position. The clamp seat 34, unlike the clamp seat 32, is freely movable along both the axis and the circumference of the pipe 30. The clamp seat 34 is formed with a thread 38 in the outer periphery of its upper end portion. A clamp fastening ring 40, on the other hand, is formed with a thread 42 in the inner periphery of its lower end, the thread 42 being engageable with the thread 38. The position of the clamp seat 34 in the axial direction of the pipe 30 is adjustable by rotating the clamp fastening ring 40.

If desired, the pipe 30 may be provided with a slide channel along its axis, and the clamp seat 34 with a lug which is biased by a spring or the like into the slide channel. The interengaged lug and slide channel will prevent the clamp seat 34 from rotating in positions of the pipe 30 other than the lower end, e.g., a position shown in FIG. 2; at the lower end, e.g., a position shown in FIG. 5, the lug will be pushed back against the spring to render the calmp seat 34 rotatable. Such will facilitate handling of the clamp seat 34.

Figure 5:
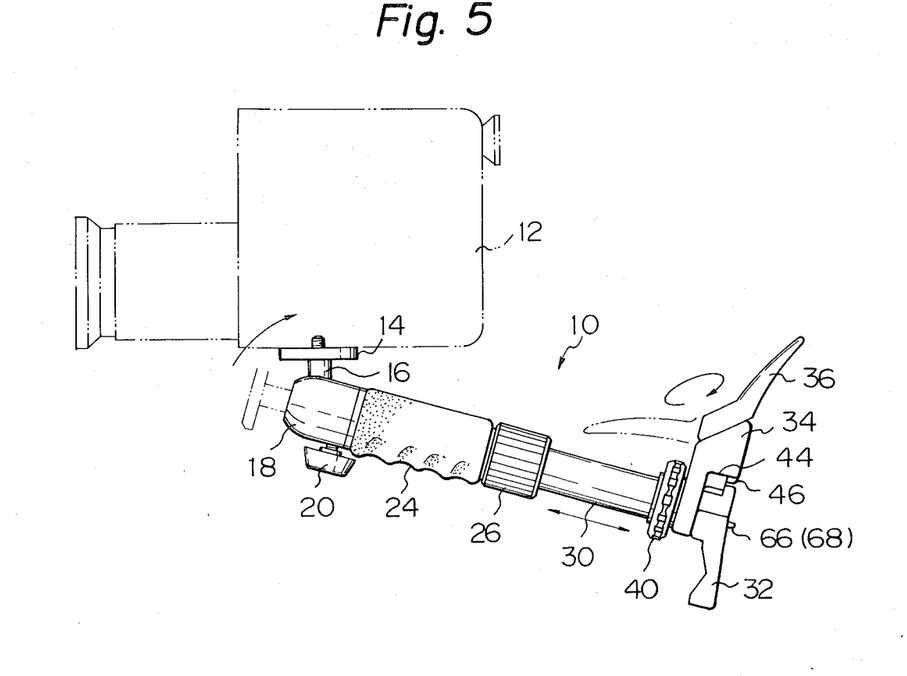
FIG. 5 shows the camera holder of FIG. 1 in a condition for serving as a breast arm.
Figure 6:
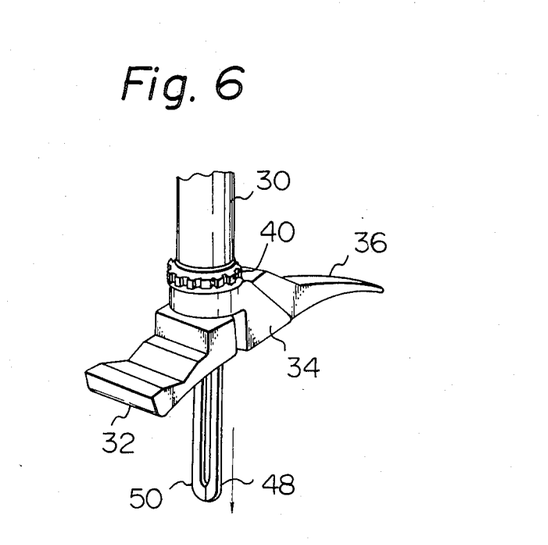
FIGS. 6 and 7 show the camera holder of FIG. 1 conditioned for operation as a tripod.
Figure 7:
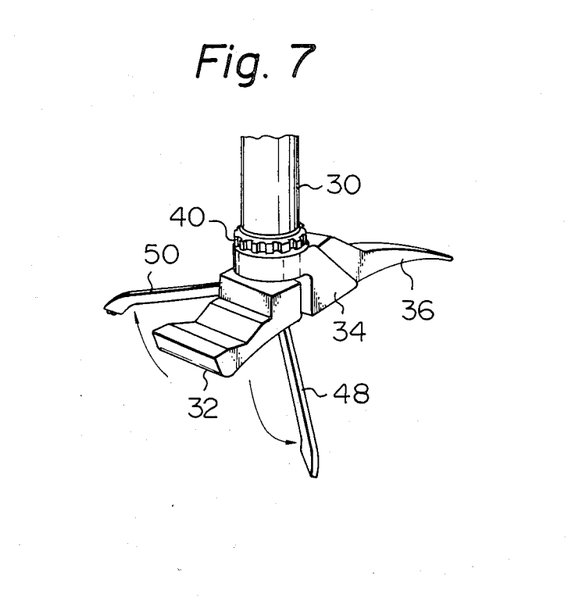
Figure 8:
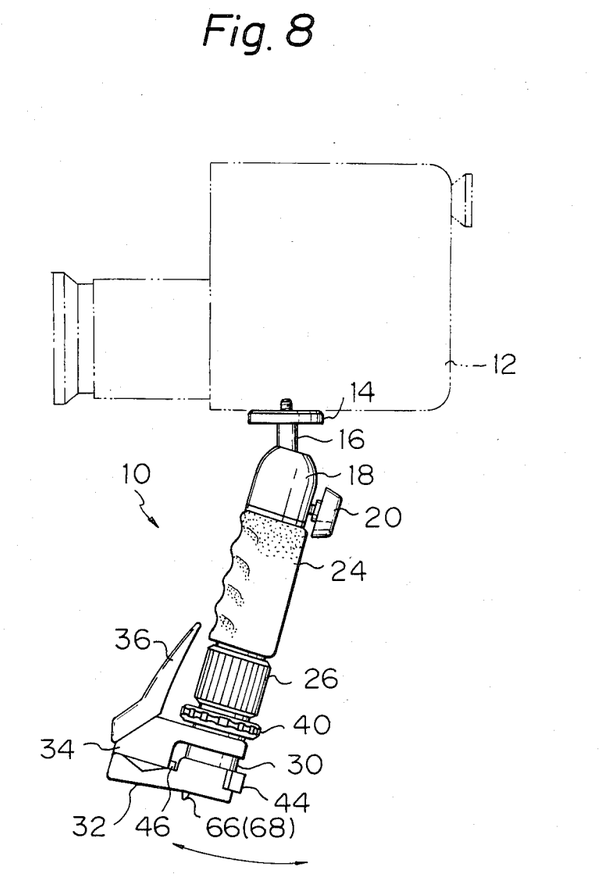
FIG. 8 shows the camera holder of FIG. 1 conditioned for operation as a grip.

The clamp seats 32 and 34 are provided with a mechanism which locks them to each other when the clamp seat 34 is rotated to a position shown in FIGS. 5–7. The locking mechanism may comprise, as illustrated, a lug 44 protruding from the clamp seat 32 and a lug 46 protruding from the clamp seat 34. When the clamp 34 is rotated 180 degrees from a position where the clamp seat 34 cooperates with the clamp 32 (clamping surfaces 32*a* and 34*a* of the clamp seats 32 and 34 face each other), the lugs 44 and 46 lock to each other to prevent the clamp seat 34 from moving along the axis of the pipe 30. For greater convenience, a snapping mechanism may be employed which limits the rotation of the clamp seat 34 along the circumference of the pipe 30 in the above-described position.

As shown in FIGS. 6 and 7, a pair of legs 48 and 50 are nested in the pipe 30 to serve as the legs of a tripod. The legs 48 and 50 can be pulled out from the pipe 30 and, after being opened away from each other by a predetermined angle in a predetermined direction, locked in position as will be described.

The camera holder 10 in accordance with the present invention is usable in various manners, or modes, as will be described.

Figure 2:
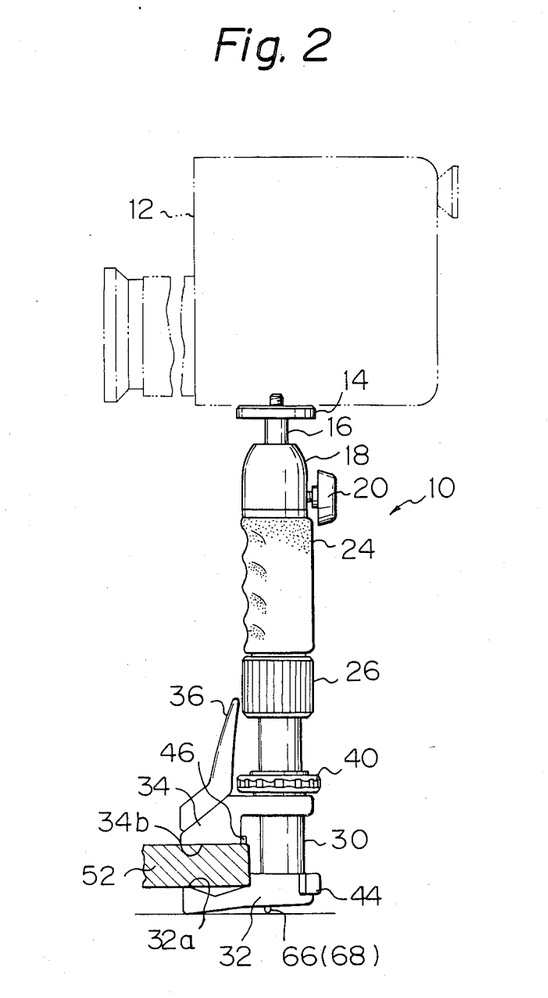
FIGS. 2-4 show the camera holder of FIG. 1 in a condition for serving as a clamp.
Figures 3, 4:
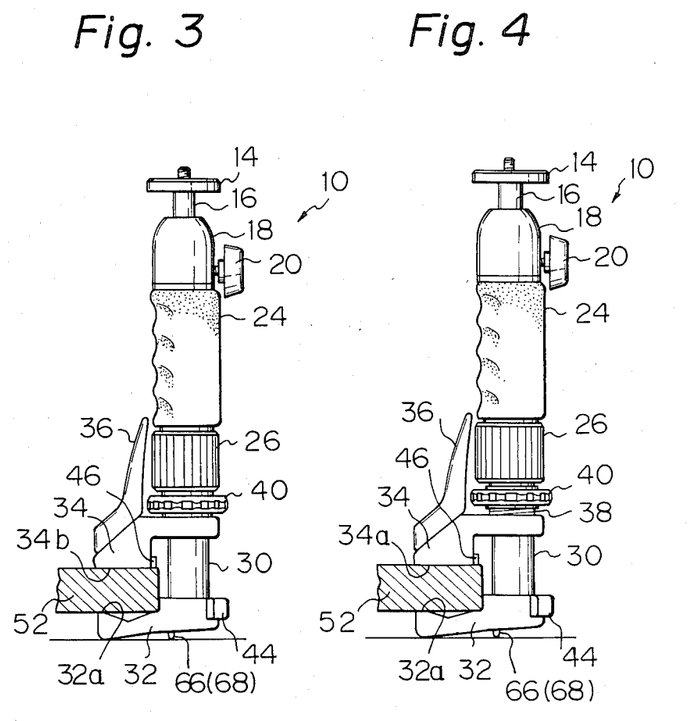

Referring to FIGS. 2–4, the camera holder 10 is shown in a condition for serving as a clamp. First, the pipes 22 and 30 are made free relative to each other by loosening the pipe fastening ring 26. After the camera holder 10 has been so positioned as to hold a solid object 52 between the clamp seats 32 and 34, the pipe 22, or grip portion 24, and the like are lowered and, then, the pipe fastening ring 26 is tightened to fasten the pipes 22 and 30 firmly to each other (FIG. 3). Even in this position, the clamp seats 32 and 34 have clamped the solid object 52 therebetween, but not with a desired magnitude of force. Thereafter, the clamp fastening ring 40 is rotated in a predetermined direction. This forces the clamp seat 34 against the clamp seat 32 because the top of the ring 40 and the bottom of the ring 26 are abutted against each other. In the resulting position shown in FIG. 4, the clamp seats 32 and 34 clamp the solid object 52 with the desired magnitude of force.

In the manner described, while the camera holder 10 is used as a clamp, it is possible to freely determined a clamp width by moving the pipe 30 or 22, that is, the camera holder 10 can clamp any desired solid object if the pipe 30 is provided with a certain length. Moreover, when not used as a clamp, the camera holder 10 can be put together in a compact and handy configuration by nesting the pipe 30 in the pipe 22.

To use the camera holder 10 in a breast support arm mode, as shown in FIG. 5, the clamp seat 34 is moved to the lower end of the pipe 30 and, then, rotated until the clamp seat 34 becomes locked to the clamp seat 32. Thereafter, the rotatable arm 36 associated with the clamp seat 34 is rotated 180 degrees, and the relative position of the pipes 22 and 30, i.e., the length of the pipe 30 outside the pipe 22, is adjusted as desired. In this position, the camera holder 10 is usable as a breast support arm in an optimum configuration for a user.

Concerning the use of the camera holder 10 in a tripod mode, as shown in FIGS. 6 and 7, while the clamp seat 34 is positioned in the same manner as in FIG. 5 which pertains to a breast support arm mode, the legs 48 and 50 are pulled out from the pipe 30 and opened away from each other. Then, the legs 48 and 50 constitute a tripod in combination with the rotatable arm 36. The length of the pipe 30 outside the pipe 22 is adjustable to locate the camera at a desired level.

As described above, the camera holder 10 functions as a clamp, a breast support arm or a tripod in an optimum way in dependence upon the position of the pipe 30 relative to the pipe 22.

Figure 9:
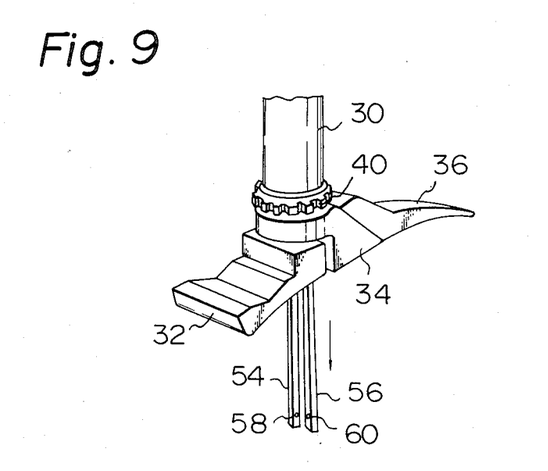
FIGS. 9-12 are views representative of a modification to legs of the camera holder of FIG. 1 which implement the tripod function, as well as functions of the modified legs.
Figure 12:
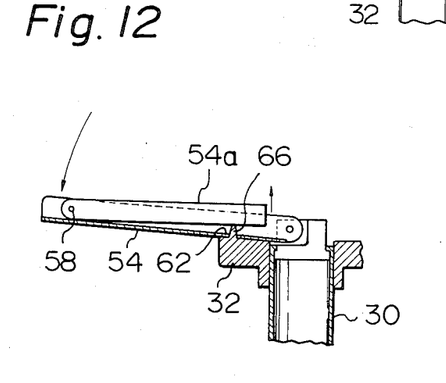

Referring to FIGS. 9 and 12, a modification to the legs 48 and 50 joined in the tripod mode operation as shown in FIGS. 6 and 7 is shown.

Figure 10:
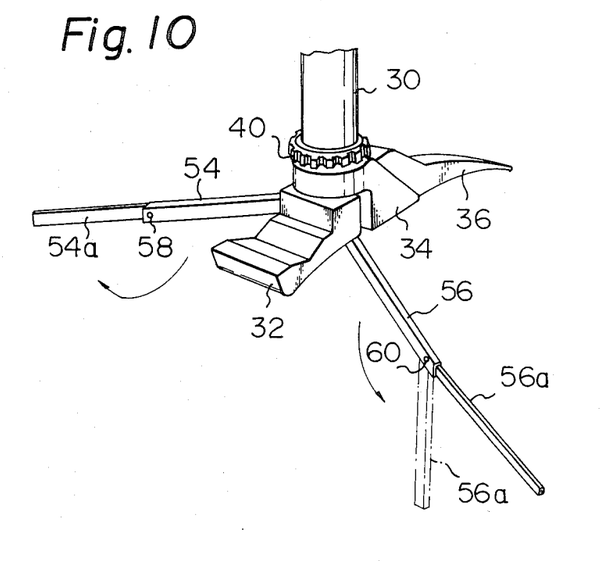
Figure 11:
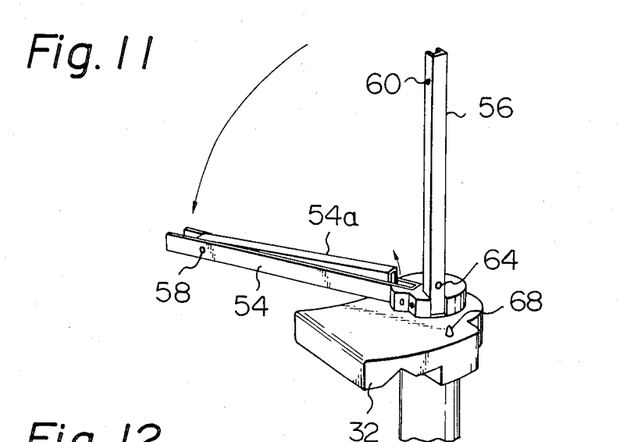

A pair of legs 54 and 56 each having a generally U-shaped cross-section and constituting a body portion are nested in the pipe 30 in the same manner as the legs 48 and 50. Legs 54*a* and 56*a* each having, for example, a rectangular cross-section and constituting a fold portion are foldably connected to the legs 54 and 56 by pins 58 and 60, respectively. When the legs 54*a* and 56*a* are rotated 180 degrees about the pins 58 and 60, respectively, they are folded into their associated legs 54 and 56 as shown in FIG. 11. Meanwhile, when the legs 54*a* and 56*a* are unfolded out of the associated legs 54 and 56 about the pins 58 and 60, they become aligned with the legs 54 and 56, respectively, as shown in FIG. 10. While each of the foldaway legs nested in the pipe 30 is shown to have one articulation, it may be provided with two or more articulations if desired.

Figure 13:
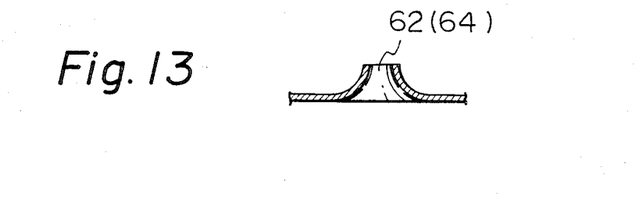
FIG. 13 shows a cross-section of the notched hole provided on the legs of the camera holder of FIG. 1.

Adjacent to their base ends, as shown in FIGS. 11 through 13, the legs 54 and 56 respectively are formed with notched holes 62 and 64 for extra strength and fitness. The bottom of the clamp seat 32, for example, is provided with lugs 66 and 68 a shape and position of each is corresponding to the notched holes 62 and 64, respectively. When the legs 54 and 56 are pulled out from the pipe 30 as shown in FIG. 9 and, then, any of them is opened away from the other to the position shown in FIG. 10, the lug 66, for example, protrudes into the leg 54 through the notch 62 as shown in FIGS. 11 and 12 so as to push the leg 54*a* a little out of the leg 54. So pushed out by the lug 66, the legs 54*a* will be easily manipulated 180 degrees to its unfolded position.

To use the legs 54, 56, 54*a* and 56*a* as a tripod, as shown in FIG. 9, the clamp seat 34 is positioned in the same manner as in FIG. 5 and the two legs 54 and 56 are pulled out from the pipe 30. Then, as shown in FIGS. 10 and 11, the legs 54 and 56 are opened whereafter the legs 54*a* and 56*a* are fully unfolded utilizing their free ends which have been pushed out a little as described. The legs 54 and 54*a* and the legs 56 and 56*a* in the unfolded position cooperate with the rotatable arm 36 to implement the function of a tripod. The length of the pipe 30 pulled out from the pipe 22 is adjustable to set up a desired height of the camera.

Where the legs usable as a tripod are articulated at one or more points as described above, the overall length of each articulated leg assembly may be increased even through if the pipe 30, for example, is relatively short. The longer legs will offer greater stability in working as a tripod. In addition, since the respective articulated legs become very short when folded up for storage, they can be accommodated in the pipe 30 even if the latter is relatively short and, therefore, the whole holder assembly assumes a compact configuration while out of use.

Further, in the modification shown and described, fully opening the legs 54 and 56 causes their associated legs 54a and 56a to be pushed thereoutof. Such allows the legs 54a and 56a to be manipulated smoothly out of the legs 54 and 56, respectively. Another advantage attainable with the lugs 66 and 68 and the holes 62 and 64 is that the legs 54 are secured thus preventing lateral dislocation and, thereby, serve with greater stability as a tripod, while attaining greater mechanical strength.

In summary, it will be seen that the present invention provides a camera holder which selectively serves the function of a clamp, that of a breast support arm, that of a tripod, and that of a grip, has a compact and handy configurion when out of use, and features easy use. Especially, in the tripod mode operation, legs of the camera holder can be fully nested in a pipe even if the latter is relatively short, and become very long when in an unfolded position. This allows the camera holder to be put together compact, to achieve stability during use, and to free its legs from unsteadiness. Furthermore, opening a first leg causes a second leg associated therewith to be partly opened, making the manipulation for opening the second leg very smooth.

Various modifications will become possible for those skilled in the art after receiving the teachings of the present disclosure without departing from the scope thereof.

What is claimed is:

1. A camera holder having multiple functions, comprising:
    first pipe provided with camera mount means at one end thereof;
    a second pipe telescoped in said first pipe from the other end of the first pipe to be slidable along an axis of the first pite;
    pipe fastening means for fastening said second pipe telescoped in the second pipe at a desired position;
    a first clamp seat rigidly mounted on the second pipe;
    a second clamp seat mounted on an outer periphery of the second pipe to be slidable along and rotatable about an axis of the second pipe, said second clamp seat being provided with a rotatable arm having locking means;
    clamp fastening means for fastening the second clamp seat after positioning the second clamp seat relative to the second pipe;
    breast support arm means constituted by the first and second clamp seats, the rotatable arm of the second clamp seat and the clamp fastening means and operable in a breast support mode such that the rotatable arm is rotated and locked by the locking means in a predetermined angular position and the second clamp seat is moved to a predetermined fixing position on the second pipe and rotated until the second clamp seat becomes locked to the first clamp seat whereby the second clamp seat is fastened by the clamp fastening means at the predetermined fixing position; and
    leg means for cooperating with said rotatable arm of the second clamp seat to constitute a tripod, said leg means being nested in the second pipe when out of use and pulled out from the second pipe when in use.

2. A camera holder as claimed in claim 1, in which the pipe fastening means comprises a tubular pipe fastening ring coupled over an outer periphery of the first pipe, and a spacer interposed between said pipe fastening ring and the outer periphery of the first pipe.

3. A camera holder as claimed in claim 1, in which the clamp fastening means comprises a slide channel extending on the outer periphery of the second pipe along an axis of the second pipe and a lug provided in the second clamp seat and engagable with the slide channel.

4. A camera holder as claimed in claim 1, in which the second clamp seat is formed with a thread in a peripheral wall of an upper portion thereof, the clamp fastening means comprising a clamp fastening ring coupled over the outer periphery of the second pipe and formed with a thread in an inner periphery thereof which is engagable with said thread of the second clamp seat.

5. A camera holder as claimed in claim 1, further comprising a grip fit on the outer periphery of the first pipe.

6. A camera holder as claimed in claim 1, further comprising positioning means for locking the first and second clamp seats to each other when the second clamp seat is positioned substantially in alignment with the first clamp seat on the outer periphery of the second pipe.

7. A camera holder as claimed in claim 6, in which said positioning means comprises lugs protruding respectively from the first and second clamp seats to be engagable with each other.

8. A camera holder as claimed in claim 1, in which the leg means comprises two legs which are nested in the second pipe when out of use and pulled out from the second pipe and opened to predetermined angular positions when in use.

9. A camera holder as claimed in claim 8, in which each of said two legs comprises a body portion and a fold portion foldably articulated to said body portion.

10. A camera holder as claimed in claim 9, in which said body portion has a generally U-shaped cross-section while said fold portion has a rectangular cross-section.

11. A camera holder as claimed in claim 10, in which the fold portion is articulated at a plurality of points.

12. A camera holder as claimed in claim 9, further comprising leg fixing means for fixing to the first clamp seat the body portion of the leg when the leg is pulled out from the second pipe and opened to the predetermined angular position.

13. A camera holder as claimed in claim 12, in which said leg fixing means comprises a notched hole formed through the body portion adjacent to an end of the body portion where the body portion is telesceoped in the second pipe, and a lug protuding from the first clamp to be engageable in said notched hole.

* * * * *